United States Patent [19]

McComber et al.

[11] Patent Number: 4,981,710

[45] Date of Patent: Jan. 1, 1991

[54] USE OF CONCENTRATED AND PURE PONTIAC POTATO STARCH

[75] Inventors: Diane R. McComber, Marshalltown, Iowa; Elizabeth M. Osman, Urbana, Ill.

[73] Assignee: Iowa State University Research Foundation, Inc., Ames, Iowa

[21] Appl. No.: 329,403

[22] Filed: Mar. 27, 1989

[51] Int. Cl.$^5$ .............................................. A23L 1/195
[52] U.S. Cl. .................................... 426/578; 426/579; 426/589; 426/658; 426/661
[58] Field of Search ............... 426/578, 579, 589, 613, 426/661, 658

[56] References Cited

U.S. PATENT DOCUMENTS

| | | | |
|---|---|---|---|
| 4,073,959 | 2/1978 | Durand | 426/578 |
| 4,228,199 | 10/1980 | Chiu et al. | 426/578 |
| 4,391,836 | 7/1983 | Chiu | 426/578 |
| 4,671,966 | 6/1987 | Giddey | 426/578 |
| 4,752,495 | 6/1988 | Smith | 426/578 |
| 4,889,734 | 12/1989 | Shatila | 426/462 |

*Primary Examiner*—Jeanette Hunter
*Attorney, Agent, or Firm*—Zarley, McKee, Thomte, Voorhees & Sease

[57] ABSTRACT

A method of preparing edible food product mixes that ordinarily require chemically cross-linked starch by preparing them from a major amount of Pontiac potato starch which has not been chemically cross-linked.

10 Claims, 1 Drawing Sheet

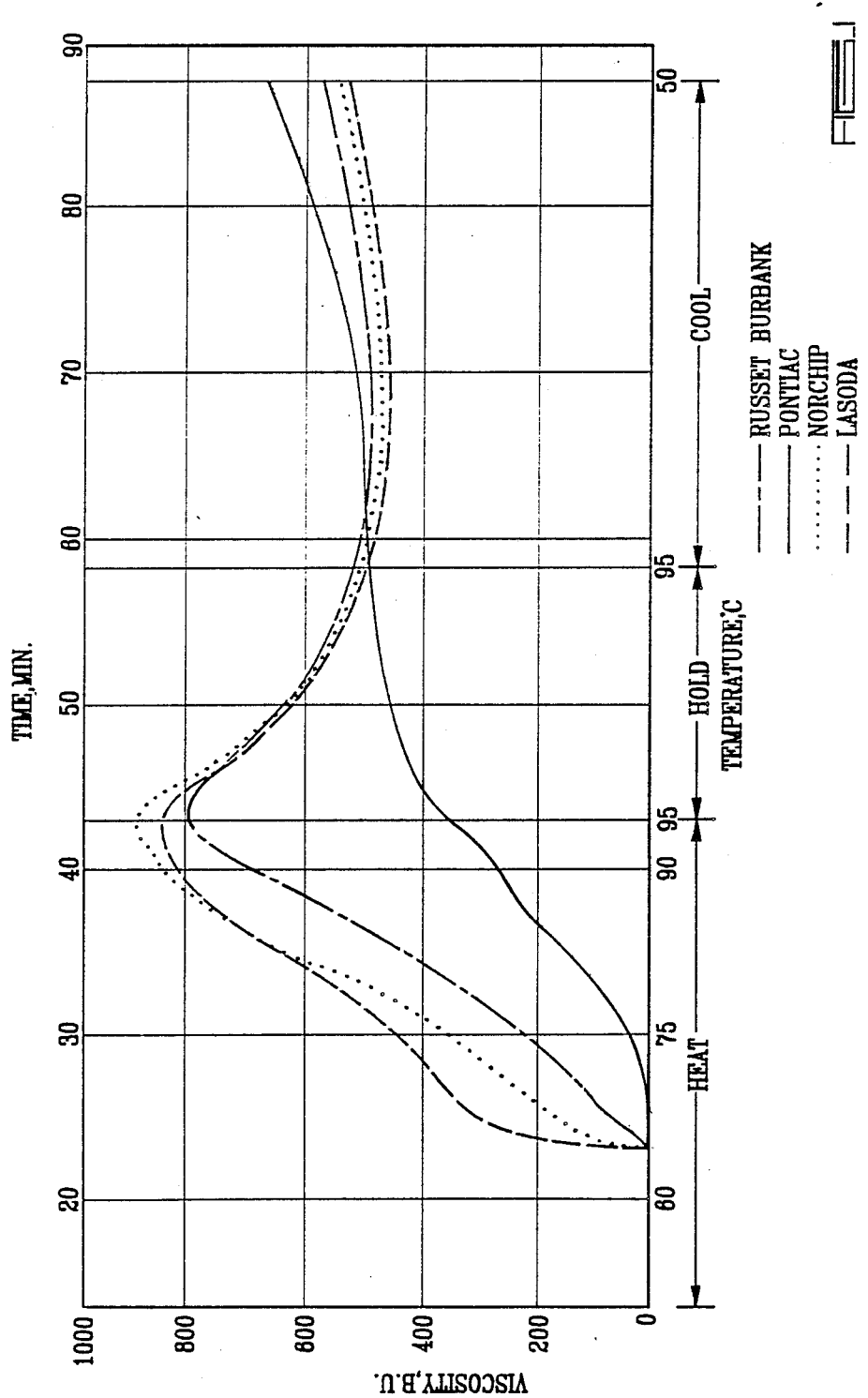

USE OF CONCENTRATED AND PURE PONTIAC POTATO STARCH

BACKGROUND OF THE INVENTION

Starches, and particularly potato starches, are often used commercially to prepare edible food products. Some of those products may, for example, include puddings, pie fillings, gravies, baby foods, salad dressings, and the like.

It is common when preparing such food products to use a chemically cross-linked starch. The reason for using cross-linking agents is that it is well-known in the art that certain starches upon gelatinization will thicken, followed by thinning. This is well-known behavior of starches, believed to be caused by gelatinization to the point where the starch granules implode and fragment, leaving them thin and possibly stringy (long-pasted).

It is, of course, expensive to cross-link natural starches in order to prevent the thinning of starch materials; additionally, there has been some question about the safety of some of the modified starches. There is additionally a market interest in "natural" foods, unmodified by chemicals. Thus it would be desirable to prepare starches which did not need added cross-linkers.

It is a primary objective of the present invention to prepare a potato starch material which does not need to be chemically modified by linking, but yet which will have certain characteristics of a chemically modified starch.

Another objective of the present invention is to prepare food products using as the starch source a potato starch prepared from Pontiac potatoes as the primary starch source. Examples of such food products include puddings, pie fillings, gravy mixes, soups, and the like.

The method of accomplishing each of these, as well as other objectives for the present invention will become apparent from the detailed description which will follow hereinafter.

BRIEF DESCRIPTION OF THE DRAWINGS

FIG. 1 shows an amylograph curve comparing the Pontiac potato starch of the present invention with other starches from other potatoes from the standpoint of viscosity.

DETAILED DESCRIPTION OF THE INVENTION

This invention is premised upon the discovery that Pontiac potato starch behaves abnormally in an amylograph in comparison with other starches. In particular, it is common for potato starches to undergo gelatinization, followed by thinning, and a decrease in viscosity after either holding at higher temperatures or after introducing shear. Such behavior is illustrated in an amylograph.

Pontiac potato starch does not behave typical of other starches. It is believed that this property of Pontiac potato starch was not heretofore known. The invention is premised upon the discovery that this abnormal behavior of Pontiac potato starch can be taken advantage of in desirable ways.

In particular, one can prepare food products using as the major portion of the starch Pontiac potato starch. When this is done, it eliminates the need for cross-linking the starches ordinarily used to prevent the undesirable results occurring after prolonged holding and/or heating and/or inducing of shear after gelatinization.

The starch of this invention is Pontiac potato starch, and as such it is known. However, this ability of the natural starch to be resistant to starch thinning and to have a shorter-textured paste is not known. This abnormal behavior allows Pontiac potato starch to be used without the necessity for added chemical cross-linking treatment. For example, when Pontiac potato starch is used as a major starch source in edible food products that contain potato starch mixes, such as gravy mixes, pudding mixes, pie fillings, soups and other starch-based edible food product mixes, there is no need for additional thickening agents that have undergone the chemical treatment. Chemical cross-linking is commonly utilized because texture is controlled during shear, heat and acid conditions. As a result, the products can be made less expensively. They are also more nearly natural.

The amount of Pontiac potato starch used is merely a function of the thickness desired. One can use up to 100% Pontiac potato starch. Preferably, the amount of Pontiac potato starch should be a major portion, that is, at least 50% of the starch mixture, and it can be up to 100%. Preferably the amount will be 70%, more preferably 80%, and in some instances 90% or 100%. The amount used is simply a matter of economics and characteristics desired for the given food product. The requirements for added thickening agents relate inversely to the amount of Pontiac potato starch. Put another way, at lower levels it may be necessary for some added thickening agent, but at higher levels there is a need for none.

The examples which will follow hereinafter are illustrative of showing of a relationship between the texture of four potato cultivars and the properties of the potato starches and juices and to specific gravity at the time of shear. They show abnormal behavior with regard to the amylograph for Pontiac potato starch.

EXAMPLES

Russet Burbank and Norchip cultivars, commonly utilized as examples of high-specific-gravity, mealy potatoes, and red-skinned Pontiac and LaSoda cultivars, commonly used as typical low-specific-gravity, waxy potatoes, were selected.

For starch isolation, stem halves of peeled potatoes (eyes and blemishes removed) were cut into pieces and shredded in an Acme Juicerator (Model 6001). Juice was collected, centrifuged to remove starch granules, and frozen immediately. The pulp was rinsed with distilled water in the juicerator, then transferred to a Waring blender with additional distilled water for thorough maceration. The mixture was placed on graduated mesh screens and washed numerous times with distilled water to separate starch from the pulp. Rinse water was centrifuged to recover starch granules. Starch was rinsed with distilled water, dried, powdered and stored. Scanning electron microscopy indicated the starch granules were undamaged.

In an amylograph, suspensions of 3.25% starch (dry basis) in distilled water were heated at a constant temperature increase of 1.5° C. per min from 30° C. to 95° C., held at 95° C. for 15 min, then cooled at a constant temperature decrease of 1.5° C. per min to 50° C.

Swelling powers were conducted by modification of the method described by Schoch, *Methods in Carbohy-* drate Chemistry, Vol. IV, Academic Press, p. 106 (1964). Two series of tests were run, varying the amount of starch and time of heating. All starch used was from the 1984 potatoes. Each starch, 0.5 g (dry substance), was placed in a centrifuge bottle with a magnetic stirring bar and 200 g distilled water. Bottles with starch from each of the four potato cultivars were heated together in water baths at 75° C., 80° C. and 85° C., with only enough agitation to keep the slurries suspended. After 30 min heating, the samples were centrifuged for 20 min at $190 \times g$. To allow thickening of the precipitated layer and hence better separation, samples were chilled for 16–20 hr before the supernatant was removed. An aliquot was dried to give percentage soluble starch. The swelling power was determined by dividing the weight of the swollen starch layer by the weight of the dry starch used. The corrected swelling power was calculated. Because of the difficulty in separation, 20 replicates were used.

The statistics used to separate the means were ordinary t-tests rather than more conservative range tests. The comparisons were only among four means and the use of range tests would lead to substantially the same conclusions.

SWELLING POWER

Swelling powers of potato starch were so high above 85° C. that the supernatant layer was poorly distinguished and 85° C. was the highest temperature used.

As the temperature was elevated, the swelling powers and percentage solubles increased (Table 1). The mealy potato starches (Russet and Norchip) exhibited nearly the same swelling powers and percentage solubles, but the waxy potato starches differed from one another. LaSoda starch swelled the most, though the percentage solubles was almost identical to that from Russet Burbank starch. Values for LaSoda cultivar at 85° C. seemed to show lower swelling; however, the syrupy appearance of the swollen granules indicated much greater swelling at that temperature; accurate separation of the layers was impossible. Swelling of pontiac starch was significantly lower than any of the others.

Amylograph

The minimal swelling of the Pontiac starch could also be seen in the amylograph comparisons (FIG. 1). Unrau and Nylund, supra, using lyophilized potato tissue, found that the Pontiac potato attained a lower maximum Brabender viscosity than two cultivars judged to be mealy. FIG. 1 also showed that Pontiac starch was the only cultivar that did not attain a peak viscosity and that increased in viscosity during the 15-min holding period at 90° C. After cooling to 50° C., Pontiac starch was thickest of the four starches and was at its maximum viscosity. The other starches were not distinguishable from one another based on viscosity.

TABLE 1

Swelling powers, solubles and corrected swelling powers of starches from four potato cultivars (1984)

| Cultivar | Temp. (°C.) | Swelling Power | Mean | Percent Soluble | Mean | Corrected Swelling Power | Mean |
|---|---|---|---|---|---|---|---|
| Russet | 75 | 60 | | 13.8 | | 69 | |
| | 80 | 95 | $93^a$ | 19.8 | $18.6^{mn}$ | 119 | $115^x$ |
| | 85 | 121 | | 21.8 | | 155 | |
| Norchip | 75 | 74 | | 13.7 | | 87 | $125^{xy}$ |
| | 80 | 95 | $99^{ab}$ | 19.5 | $19.6^m$ | 119 | |
| | 85 | 127 | | 25.6 | | 170 | |
| Pontiac | 75 | 46 | | 10.9 | | 51 | $82^z$ |
| | 80 | 70 | $70^c$ | 13.7 | $13.8^o$ | 82 | |
| | 85 | 92 | | 16.8 | | 111 | |
| LaSoda | 75 | 88 | | 13.2 | | 103 | |
| | 80 | 124 | $111^b$ | 18.8 | $17.5^n$ | 153 | $135^y$ |
| | 85 | 115 | | 20.1 | | 144 | |

[1]In a given column, means with the same superscript are not significantly different based on a t-test ($P < 0.05$).

It can be seen from the above data that Pontiac potato starch was more resistant to swelling than the starches from other cultivars, and that it was more resistant to thinning.

Using the Pontiac potato starch without any added cross-linkers at the percentage levels specified, one may prepare successfully a number of food products which are equally as good as the conventional produces with chemically cross-linked starches. Such products include puddings, pie fillings, gravies, baby foods and salad dressings.

What is claimed is:

1. In the method of preparing edible food product mixes containing chemically cross-linked starches which have enhanced ability to thicken and are resistant to thinning, the improvement comprising employing as a major portion of the starch source of said edible food product mix a non cross-linked Pontiac potato starch.

2. The method of claim 1 wherein said commercial potato starch is at least 80% Pontiac potato starch.

3. The method of claim 1 wherein said commercial potato starch is at least 90% Pontiac potato starch.

4. The method of claim 1 wherein said commercial potato starch is substantially completely Pontiac potato starch.

5. The method of claim 1 wherein the food product mix is selected from the group consisting of gravy mixes, pudding mixes, pie fillings, soups and other starch-based, edible food product mixes which ordinarily require thickening agents.

6. The method of claim 1 wherein the potatoes are red-skinned Pontiac potatoes.

7. In edible food product mixes which have a starch component and a chemically cross-linked thickening agent added to the starch component as an aid to assure that the starch component will thicken and not be susceptible to later thinning, the improvement comprising using as a major portion of the starch component a non-chemically cross-linked Pontiac potato starch.

8. The composition of claim 7 which is at least 80% Pontiac potato starch.

9. The composition of claim 7 which is at least 90% Pontiac potato starch.

10. The composition of claim 7 which is substantially completely Pontiac potato starch.

* * * * *